US012598198B2

(12) United States Patent
Wray et al.

(10) Patent No.: US 12,598,198 B2
(45) Date of Patent: Apr. 7, 2026

(54) DETECTING DATA EXFILTRATION AND INFILTRATION OVER DNS

(71) Applicant: Oracle International Corporation, Redwood Shores, CA (US)

(72) Inventors: Stuart Wray, Cambridge (GB); Felix Schmidt, Zurich (CH); Craig Schelp, Vancouver (CA); Desislava Wagenknecht-Dimitrova, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 18/638,267

(22) Filed: Apr. 17, 2024

(65) Prior Publication Data

US 2025/0330476 A1 Oct. 23, 2025

(51) Int. Cl.
H04L 9/40 (2022.01)
G06F 16/28 (2019.01)

(52) U.S. Cl.
CPC ........ H04L 63/1416 (2013.01); G06F 16/285 (2019.01); H04L 63/126 (2013.01)

(58) Field of Classification Search
CPC .. H04L 63/1416; H04L 63/126; G06F 16/285
See application file for complete search history.

(56) References Cited

U.S. PATENT DOCUMENTS 7,950,058 B1 * 5/2011 Rockwood .......... H04L 63/1416
726/23
8,578,480 B2 * 11/2013 Judge ................. H04L 63/1466
713/192

8,839,435 B1 * 9/2014 King ................... H04L 63/1425
726/22
9,112,900 B1 * 8/2015 Peacock ................. G06F 40/14
9,325,735 B1 * 4/2016 Xie ..................... H04L 63/1425
9,578,048 B1 * 2/2017 Hunt ................... H04L 63/1416
9,660,960 B2 * 5/2017 Phonsa .............. H04L 63/1433
(Continued)

OTHER PUBLICATIONS

Das et al., Detection of Exfiltration and Tunneling over DNS, IEEE, 2017 (Year: 2017).*

(Continued)

*Primary Examiner* — David Garcia Cervetti
(74) *Attorney, Agent, or Firm* — Mughal Gaudry & Franklin PC

(57) ABSTRACT

A computer system includes a detector that monitors DNS communications to detect data exfiltration and/or infiltration that is attempted or has occurred in the DNS communications. DNS communications are stored and parsed to distinguish content that is potentially not public being communicated in a prefix and content contained in a publicly available suffix. The content of the prefix is examined to determine an amount of information conveyed in the prefix based at least in part on a length and a number of unique characters of the prefix. The detector aggregates communications for network sources and/or destinations, and/or for different network groups or characteristics to determine sources, destinations, groups, and/or characteristics associated with aggregate amounts of information that satisfy one or more notification conditions or trigger one or more other corrective actions.

24 Claims, 8 Drawing Sheets

(56) References Cited

U.S. PATENT DOCUMENTS

| | | | | |
|---|---|---|---|---|
| 9,819,696 | B2 * | 11/2017 | Minea | H04L 63/145 |
| 9,875,355 | B1 * | 1/2018 | Williams | H04L 63/1408 |
| 10,216,837 | B1 * | 2/2019 | Saikia | G06F 16/35 |
| 10,498,751 | B2 * | 12/2019 | Yu | H04L 63/1416 |
| 10,560,480 | B1 * | 2/2020 | Sirigiri | H04L 63/1425 |
| 11,153,330 | B1 * | 10/2021 | Antoniewicz | H04L 61/4511 |
| 11,184,392 | B2 * | 11/2021 | Thomas | H04L 63/1491 |
| 12,056,169 | B1 * | 8/2024 | Mishra | G06N 20/10 |
| 12,101,342 | B2 * | 9/2024 | Myers | H04L 63/1408 |
| 12,335,291 | B2 * | 6/2025 | Huang | G06N 20/00 |
| 2003/0196095 | A1 * | 10/2003 | Jeffries | G06F 21/51 |
| | | | | 713/181 |
| 2006/0143712 | A1 * | 6/2006 | Grosse | G06F 21/552 |
| | | | | 726/24 |
| 2009/0328221 | A1 * | 12/2009 | Blumfield | G06F 21/564 |
| | | | | 726/24 |
| 2015/0278188 | A1 * | 10/2015 | Aras | G06F 40/211 |
| | | | | 709/245 |
| 2016/0294773 | A1 * | 10/2016 | Yu | H04L 63/1425 |
| 2017/0295187 | A1 * | 10/2017 | Havelka | H04L 63/1441 |
| 2018/0041521 | A1 * | 2/2018 | Zhang | H04L 63/1416 |
| 2018/0063162 | A1 * | 3/2018 | Baughman | H04L 63/1416 |
| 2018/0097835 | A1 * | 4/2018 | McGrew | H04L 63/145 |
| 2018/0115582 | A1 * | 4/2018 | Thakar | H04L 63/1466 |
| 2018/0124020 | A1 * | 5/2018 | Rodriguez | H04L 63/1425 |
| 2018/0139240 | A1 * | 5/2018 | Voit | H04L 63/1433 |
| 2019/0058718 | A1 * | 2/2019 | Pangeni | H04L 63/1425 |
| 2019/0130100 | A1 * | 5/2019 | Dymshits | G06F 16/90335 |
| 2019/0297103 | A1 * | 9/2019 | Seshadri | H04L 63/1416 |
| 2020/0106791 | A1 * | 4/2020 | Bagnall | H04L 61/4511 |
| 2020/0267167 | A1 * | 8/2020 | Venkataswami | H04L 41/0213 |
| 2021/0266293 | A1 * | 8/2021 | Liu | H04L 61/5007 |
| 2021/0400061 | A1 * | 12/2021 | Antoniewicz | H04L 61/4511 |
| 2022/0182401 | A1 * | 6/2022 | Boord | H04L 63/1441 |
| 2022/0210170 | A1 * | 6/2022 | Di Pinto | H04L 63/1416 |
| 2022/0407870 | A1 * | 12/2022 | Vega | H04L 61/4511 |
| 2023/0130232 | A1 * | 4/2023 | Liu | H04L 61/58 |
| | | | | 726/22 |
| 2023/0275912 | A1 * | 8/2023 | Shahul | H04L 41/16 |
| | | | | 726/23 |
| 2023/0336572 | A1 * | 10/2023 | Xiao | H04L 63/1441 |
| 2023/0388322 | A1 * | 11/2023 | Bhatnagar | H04L 63/1425 |
| 2024/0037443 | A1 * | 2/2024 | You | G06F 16/953 |
| 2024/0205240 | A1 * | 6/2024 | Duan | H04L 63/1466 |
| 2025/0139244 | A1 * | 5/2025 | Zeng | G06F 21/564 |
| 2025/0202916 | A1 * | 6/2025 | Duan | H04L 63/1425 |

OTHER PUBLICATIONS

Zhang et al., Detection of Data Leakage Based on DNS Traffic, IEEE, 2023 (Year: 2023).*

Nadler et al., Detection of malicious and low throughput data exfiltration over the DNS protocol, Elsevier, 2018 (Year: 2018).*

Liu et al., A Byte-level CNN Method to Detect DNS Tunnels, IEEE, 2019 (Year: 2019).*

Sammour et al., Comparative Analysis for Detecting DNS Tunneling Using Machine Learning Techniques, 2017 (Year: 2017).*

Ahmed et al., Monitoring Enterprise DNS Queries for Detecting Data Exfiltration From Internal Hosts, IEEE, 2020 (Year: 2020).*

Born et al., Detecting DNS Tunnels Using Character Frequency Analysis, In Proceedings of the 9th Annual Security Conference, Las Vegas, NV, Apr. 7-8, 2010 (Year: 2010).*

Palau et al., DNS Tunneling: A Deep Learning based Lexicographical Detection Approach, arXiv, 2020 (Year: 2020).*

Tatang et al., Below the Radar: Spotting DNS Tunnels in Newly Observed Hostnames in the Wild, IEEE, 2019.*

Jawad et al., Identifying DNS Exfiltration based on Lexical Attributes of Query Name, IEEE, 2021.*

Steadman et al., DNSxD: Detecting Data Exfiltration Over DNS, IEEE, 2018.*

Application and Figures for U.S. Appl. No. 18/613,393, filed Mar. 22, 2024.

U.S. Appl. No. 18/895,085, filed Sep. 24, 2024.

U.S. Appl. No. 18/895,089, filed Sep. 24, 2024.

U.S. Appl. No. 19/091,714, filed Mar. 26, 2025.

* cited by examiner

300

400

DETECTING DATA EXFILTRATION AND INFILTRATION OVER DNS

BACKGROUND

Individuals and companies strive to maintain protected networks to promote the data security, privacy, confidential information, and trade secrets of individuals within the networks. Many network security configurations have a network device at an edge of the network. The network device may monitor traffic coming into and going out of the network and may implement a firewall to block communication with network endpoints that are known to carry a significant risk of compromising the network.

If a network endpoint is not known to carry a significant risk of compromising the network, the firewall implemented by network devices may still block communication with the network endpoint if traffic to or from the network endpoint includes known virus signatures. For example, the network device may detect a signature of specific content in a network communication, and the signature may be mapped to known malware. The network device may block network communications with these known signatures to protect the network regardless of the network endpoints involved in the communication.

If the network communications do not match known malware signatures, and if the communications are not with known compromised endpoints, individuals, companies, and their network devices have little remaining hope of detecting compromised communications between the network and external endpoints.

To complicate matters, individuals and companies often default to allowing traffic through the firewall to accommodate a variety of software functionality within the network. Different types of network protocols, including Internet Protocol (IP), Transmission Control Protocol (TCP), User Datagram Protocol (UDP), Domain Name System (DNS), Hypertext Transfer Protocol (HTTP), and Secure Hypertext Transfer Protocol (HTTPS) are used for different purposes to support key functionality within the network. IP traffic is sent from endpoint to endpoint based on known IP addresses. TCP and UDP traffic provides secure transmission of data. DNS traffic requests and provides mappings of domain names to IP addresses. HTTP traffic transfers data between a server and a client, which is typically a web browser client, and HTTPS provides a mechanism to encrypt communications between the server and the client. For networks that support a wide variety of devices for a wide variety of people, firewalls can have many large exceptions that allow certain types of traffic to pass through unimpeded to avoid interfering with the wide variety of functionality of the devices in the network.

BRIEF SUMMARY

In some embodiments, a computer-implemented method includes monitoring DNS communications to detect data exfiltration and/or infiltration that is attempted or has occurred in the DNS communications. DNS communications are stored and parsed to distinguish content potentially being communicated in a prefix and content contained in a publicly available suffix. The content of the prefix is examined to determine an amount of information conveyed in the prefix based at least in part on a length and a number of unique characters of the prefix. A detector aggregates communications for network sources and/or destinations, and/or for different network groups or characteristics to determine sources, destinations, groups, and/or characteristics associated with aggregate amounts of information that satisfy one or more notification conditions or trigger one or more other corrective actions.

In one embodiment, a computer-implemented method includes storing a plurality of Domain Name Service (DNS) communications for a DNS server. Each DNS communication of the plurality of DNS communications comprises one or more DNS communication characteristics and a content item. The computer-implemented method further includes generating a plurality of clusters of content items from the plurality of DNS communications based at least in part on at least one DNS communication characteristic of the one or more DNS communication characteristics. For each cluster of particular content items of the plurality of clusters of content items from the plurality of DNS communications, the computer-implemented method determines an aggregate amount of information conveyed by the particular content items in the cluster based at least in part on, for each unique content item among the particular content items a length of the unique content item, and a number of different characters in the unique content item. The computer-implemented method then detects that a particular cluster having a particular one or more values for the at least one DNS communication characteristic has a particular aggregate amount of information that satisfies one or more notification conditions. Based at least in part on detecting that the particular cluster has the particular aggregate amount of information that satisfies the one or more notification conditions, the computer-implemented method triggers a notification reporting the particular aggregate amount of information and the particular one or more values for the at least one DNS communication characteristic.

In a further embodiment, the plurality of DNS communications comprise DNS requests. In a particular embodiment, the at least one DNS communication characteristic is a public domain name suffix of a DNS communication target. The computer-implemented method further includes parsing the DNS requests to separate public domain suffixes from content items of request text. In another particular embodiment, the at least one DNS communication characteristic is a virtual network identifier of a DNS communication source. The computer-implemented method further includes accessing metadata associated with the DNS requests to identify virtual network identifiers of sources of the DNS requests. In yet another particular embodiment, the at least one DNS communication characteristic is a subnet identifier of a DNS communication source. The computer-implemented method further includes accessing metadata associated with the DNS requests to identify subnet identifiers of sources of the DNS requests. In another particular embodiment, the at least one DNS communication characteristic is a host comprising a DNS communication source. The computer-implemented method further includes accessing metadata associated with the DNS requests to identify hosts that originated the DNS requests. In another particular embodiment, the at least one DNS communication characteristic is a tenant source of a DNS communication. The computer-implemented method further includes accessing metadata associated with the DNS requests to identify tenant sources of the DNS requests.

In the same or a different embodiment, the plurality of DNS communications comprise DNS responses. In a particular embodiment, the at least one DNS communication characteristic is a virtual network identifier of a DNS communication source. The computer-implemented method further includes accessing metadata associated with the DNS responses to identify virtual network identifiers of sources of the DNS responses. In another particular embodiment, the at least one DNS communication characteristic is a public domain suffix of a DNS communication target, and the computer-implemented method further includes parsing the DNS responses to separate public domain suffixes from content items of response text.

In the same or a different embodiment, the computer-implemented method performs determining an aggregate amount of information at least in part by computing a product of the length of the unique content item from unique content items among the particular content items and a logarithm of the number of different characters of the unique content item from the unique content items, and summing information conveyed by the unique content items.

In the same or a different embodiment, the computer-implemented method further includes determining a number of unique content items among the particular content items, computing a sum of information conveyed by the unique content items, and dividing the summed information by the number of the unique content items. The aggregate amount of information is an average amount of information conveyed by the unique content items.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
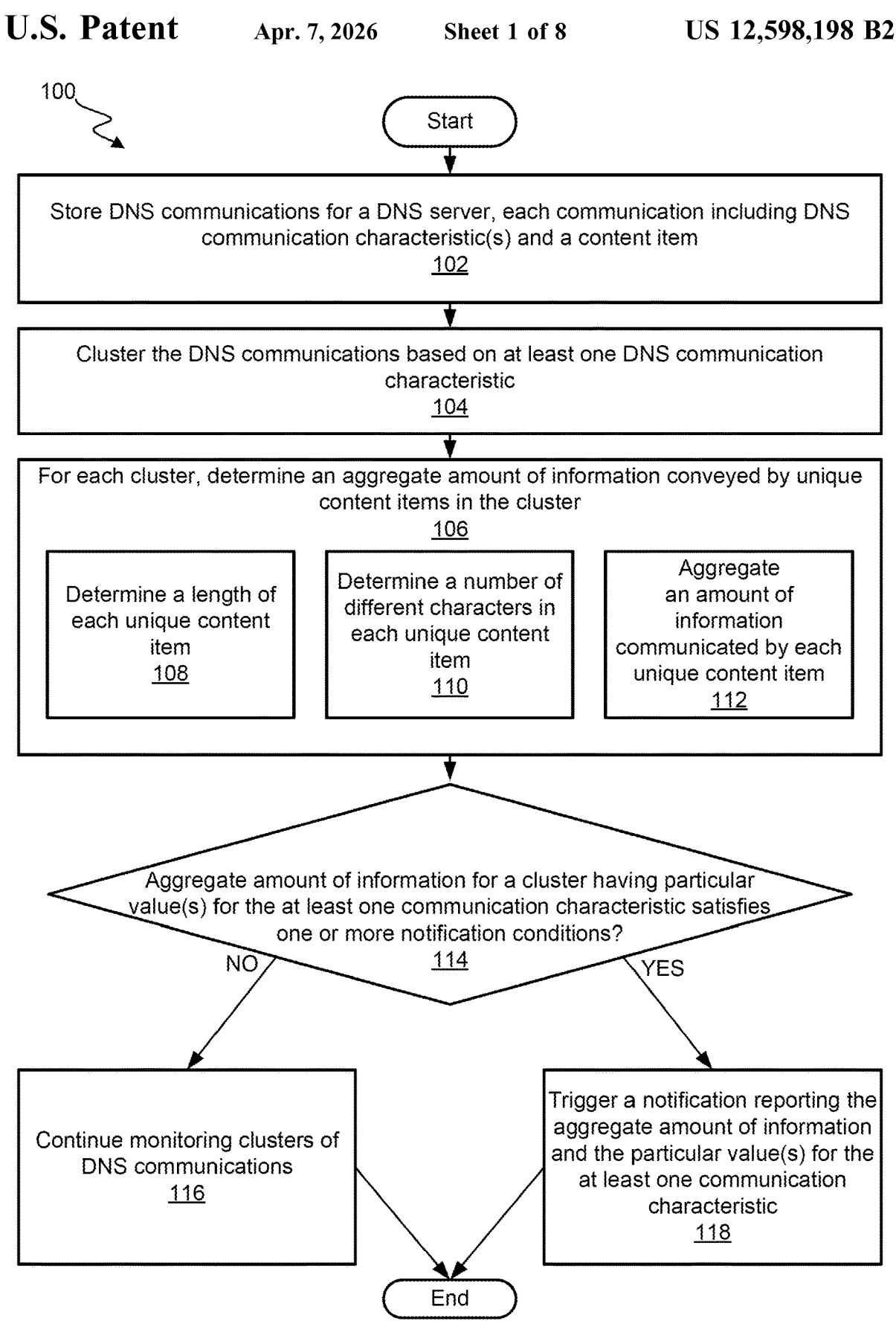
FIG. 1 shows a flow chart illustrating an example process flow for detecting information exfiltration and/or infiltration in DNS communications.

DNS communications, or logs of the DNS communications, may be stored and parsed to distinguish content that is potentially not public from content contained in a publicly available suffix. The content may be evaluated as public or non-public as of the time of communication, even if the content is being evaluated asynchronously later. For example, content from a public suffix list may be distinguished from other content in the DNS communications. The content that is potentially not public is examined to determine an amount of information conveyed based at least in part on a length and a number of unique characters of the content that is potentially not public. A detector aggregates communications for network sources and/or destinations, and/or for different network groups or characteristics to determine sources, destinations, groups, and/or characteristics associated with aggregate amounts of information that satisfy one or more notification conditions or trigger one or more other corrective actions. In various embodiments, the detector is implemented using non-transitory computer-readable storage media to store instructions which, when executed by one or more processors of a computer system, cause logs to be analyzed, results to be stored, and/or responsive actions to be triggered. The computer system may communicate with client computer systems for monitoring the network and responding to network threats such as indications of unauthorized information exfiltration and/or infiltration.

A description of detecting information infiltration and/or exfiltration over DNS communications is provided in the following sections:

MONITORING DNS TRAFFIC.
DETECTING INFILTRATION AND EXFILTRATION IN DNS TRAFFIC
DNS QUERY ENTROPY
DNS RESPONSE ENTROPY.
CORRECTING INFILTRATION AND EXFILTRATION
COMPUTER SYSTEM ARCHITECTURE
The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Monitoring DNS Traffic

IP addresses are long and difficult to remember. For example, IPv4 has 32-bit numbers, and IPV6 has 128-bit numbers. The number identifies a machine somewhere on the Internet, and the machine can be reached using the number. IP addresses are issued in bulk, though, and there is typically no logical connection between the site's services and the IP address itself. Domain names are often used to identify machines in a more logical and organized manner that is easier for a human to recall from memory and which may even remain more fixed over time. Domain names are used as textual lookups for IP addresses. The mappings between domain names and IP addresses can change over time so similar functionality can be reached on different machines over time depending on the domain name owner's preferences. This also allows domain names to change ownership with a new owner using a different machine as a point of contact. These changes may occur behind-the-scenes relative to a user, as the domain name typed into a browser is seamlessly re-mapped to a new IP address by a domain name service (DNS) server that receives an updated mapping whenever an update is published.

Domain names can then be used by querying the DNS server to find the IP address based on the domain name. The DNS server stores mappings of domain names to IP addresses for answering the queries. If the domain name is not present in the DNS server's mappings, the DNS server may contact other DNS servers, such as a root DNS server, to retrieve the mapping or an IP address of where to retrieve the mapping so the IP address resulting from the mapping may be returned in response to the query.

A DNS server local to a network may provide domain name services for machines in the network. The local DNS server may reach out to other DNS servers within the network or may reach outside of the network to an external DNS server to retrieve supplemental mapping information for responding to the queries. This outreach by the DNS server within the network or at a boundary of the network to a DNS server outside the network could expose information from within the network because the outreach may contain one or more DNS queries that include information gathered internal to the network. The DNS outreach communications cannot be blocked by default because DNS queries most commonly relate to legitimate requests for unknown DNS mappings that are needed to support legitimate requests from within the network by devices trying to reach a destination for legitimate purposes. Without these updated DNS mappings, browsers and other software operating within the network would be unable to reach correct destinations to retrieve or communicate content for these legitimate purposes.

Local DNS servers may group queries together into a DNS message to another DNS server to retrieve answers to multiple queries about unknown mappings, and the local DNS servers may receive a response that may, in turn, be used to respond to DNS queries received by the local DNS servers. For example, the local DNS server may batch 10 queries of domain names together in the same DNS packet to produce 10 IP addresses that result from the 10 queries. The local DNS server may then cache answers received and use the answers to respond to other DNS queries received, some of which may be about the same domain names.

The DNS protocol is fundamental to the operation of the Internet, since the DNS protocol translates between application-level "domain names" and the lower-level IP addresses which are used by networking hardware. So, even in networks which are robustly protected by firewalls, the networks typically allow DNS queries and replies to transit through those firewalls. Otherwise, the web-browser could not find the IP address corresponding to the domain name in a link that the user just clicked on.

DNS protocol traffic is often communicated through firewalls unimpeded and is often a source for attacks that exfiltrate data from a system. DNS traffic can be abused to provide a command-and-control channel for malware, or for other kinds of exfiltration, by encoding information in the plain-text of DNS queries directed to an external DNS server under the control of the attacker. This external DNS server could be anywhere in the world. For example, DNS information exfiltration has been used to exfiltrate credit-card details from compromised point-of-sale terminals.

Based on the DNS communication alone, the DNS server might not be able to determine the purpose of a network endpoint. The network endpoint may be used with particular software to support legitimate but obscure operations, or the network endpoint may not even exist but instead exists virtually hosted by another device as a channel to receive information exfiltrated from the target network or to infiltrate information to the target network. The information being infiltrated or exfiltrated may be encrypted, and the DNS server might not be able to detect any particular pattern or signature that indicates the DNS communication is being used for improper purposes. A network administrator would also have a difficult time predicting what data might be exfiltrated from the network, as the network administrator usually becomes aware of the risk after compromise has already occurred. Even if patterns and ad-hoc rules are configured in a firewall of the network, there are many ways to evade such ad-hoc rules, and the rules tend either to fire too often (leading to false-positives which are ignored) or too seldom (leading to genuine exfiltration traffic being ignored).

DNS communications are frequently used for positive purposes that do not improperly infiltrate or exfiltrate information to or from a network. For example, a user within the network may legitimately want to navigate to a new web site in a browser, and the DNS server internal to the network may need to reach out to an external DNS server to retrieve the IP address for the new web site. On the other hand, DNS communications may be used for negative purposes that do improperly infiltrate or exfiltrate information to or from a network. For example, malware within the network may illegitimately attempt to expose information from within the network by requesting to navigate to a site with a domain name fabricated by the malware to expose information, and the DNS server internal to the network may reach out to an external DNS server to retrieve the IP address by sending out the fabricated domain name that exposes the information. To maximize exposed information by the malware, the fabricated domain name is likely to be long and never before seen by DNS servers in the DNS mapping exchange pipeline. However, not all long and never before seen domain names are malicious. Currently, DNS servers are not able to efficiently and consistently distinguish between the two types of requests.

Techniques described herein include synchronous and/or asynchronous analyses of DNS server activity to determine whether information is improperly being communicated outside the network. In one embodiment, the DNS request and/or DNS response logs may be analyzed asynchronously with consumption, for DNS routing, of the DNS requests and DNS responses to determine whether information is improperly being communicated outside the network. In this embodiment, DNS servers may log requests that are made to internal or external DNS servers for mappings, and responses that are received from internal or external DNS servers with mappings. The logs may be analyzed at any time regardless of the times of the requests and/or responses. In another embodiment, the DNS server may include an in-line analysis, synchronously with the consumption of DNS requests and/or DNS responses for DNS routing, to determine whether information is improperly being communicated outside the network. The synchronous analysis may be performed before the DNS request or response is passed outside the network to prevent information exfiltration before some or all of the information is communicated externally.

An attacker using DNS queries to exfiltrate information would be encoding that information somehow in each query. The detector described herein may estimate the information in a query to focus analysis on the domains whose DNS servers are receiving the most information. No ad-hoc rules are needed if to estimate the information in each DNS query or in aggregate across many DNS queries to a particular destination or sharing particular characteristics. Measuring the properties of DNS queries, such as average or total information, allows the detector to detect exfiltration without requiring "indicators of compromise" or known signatures for known attacks. To estimate information, in one embodiment, the detector approximates an entropy of each DNS query based at least in part on a length of the DNS query and a number of unique characters in the DNS query, such as a product of the length of at least a portion of the DNS query and a logarithm of the number of unique characters in at least a portion of the DNS query.

In one embodiment, DNS query logs also show the "type" of the query (e.g. A, AAAA, TXT, MX, etc) and the response received from the query with a return code that indicates whether or not the query was successful. An AAAA type of query relates to an IPV6 address, which is four times the size of an IPV4 address. An A type of query is an IPV4 address. An MX type of query relates to a mail exchanger, which is used to create email addresses from a domain. A TXT type of query is a text record, which is used to communicate text and may, for example, be used to verify domain ownership. The information communicated by DNS communications may be collected and aggregated based at least in part on DNS communication type to provide a better understanding of whether certain types of queries are being used to maliciously expose information.

The log may also contain the IP address of the requesting host. Additionally or alternatively, the logs may include a record of the network, virtual-network, hostname, tenancy, owner, and/or user-id of the requestor. These characteristics may be retrievable from another administrative system and/or recorded in the log item directly so the information is self-contained and "denormalized". The information communicated by DNS communications may be collected and aggregated based at least in part on these characteristics to provide a better understanding of whether certain queries with certain characteristics are being used to maliciously expose information.

Detecting Infiltration and Exfiltration in DNS Traffic

FIG. 1 shows a flow chart illustrating an example process flow 100 for detecting information exfiltration and/or infiltration in DNS communications. As shown, process flow 100 starts in block 102, where DNS communications are stored for a DNS server. Each communication includes DNS communication characteristic(s) and a content item. For example, the content item may exclude public information such as the suffix domain (e.g., oracle.com or google.com) and be limited to those aspects of the DNS communication that are not necessarily publicly available. In block 104, the DNS communications may be clustered based on at least one DNS communication characteristic, such as a source or destination of the DNS communication or characteristics describing the source or destination of the DNS communication. For example, the source or destination of the DNS communication may be grouped with other sources of the same network or having the same owner. For each cluster, a detector determines an aggregate amount of information conveyed by unique content items in the cluster in block 106. This includes, in block 108, determining the length of each unique content item, and, in block 110, determining a number of different characters in each unique content item. The detector then aggregates an amount of information communicated by each unique content item in block 112.

In block 114, the detector then determines whether an aggregate amount of information for a cluster having particular value(s) for the at least one communication characteristic satisfies one or more notification conditions. If yes, in block 118, the detector triggers a notification reporting the aggregate amount of information and the particular value(s) for the at least one communication characteristic. If no, in block 116, the detector continues monitoring clusters of DNS communications, either synchronously or asynchronously with processing of the DNS communications for DNS routing purposes.

Figure 2:
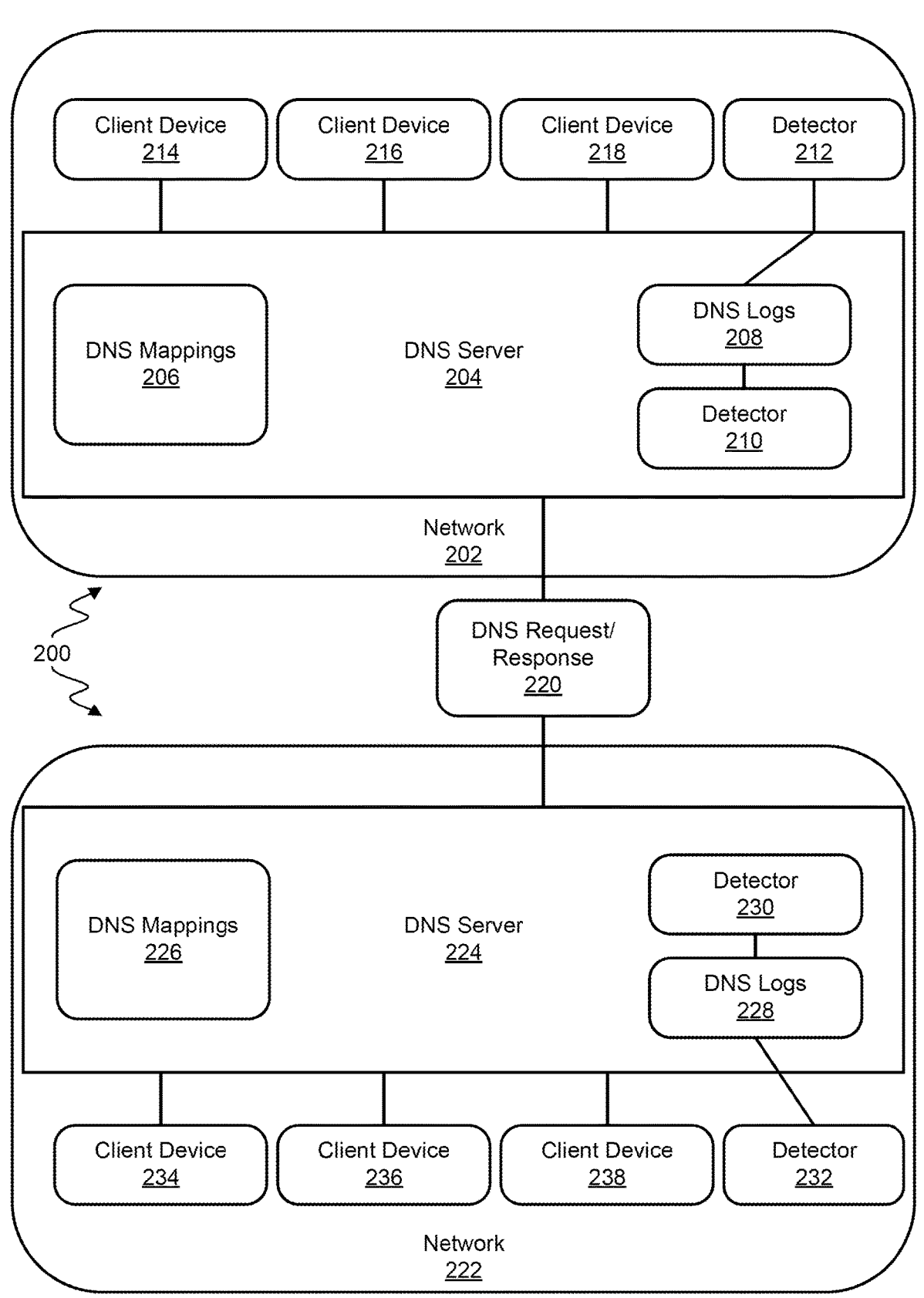
FIGS. 2, 3, and 4 show system diagrams illustrating example computer systems for detecting information exfiltration and/or infiltration in DNS communications.
Figure 3:
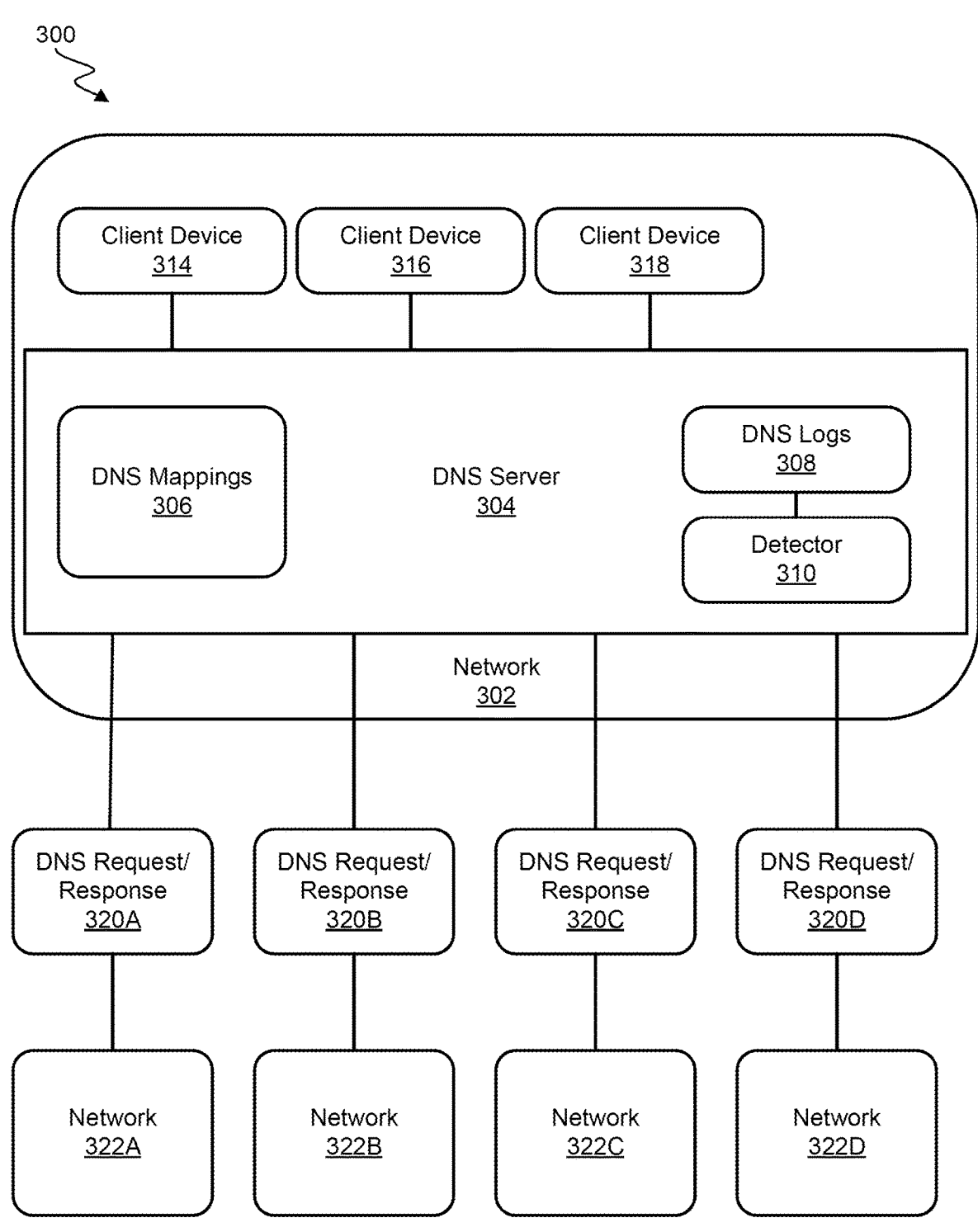
Figure 4:
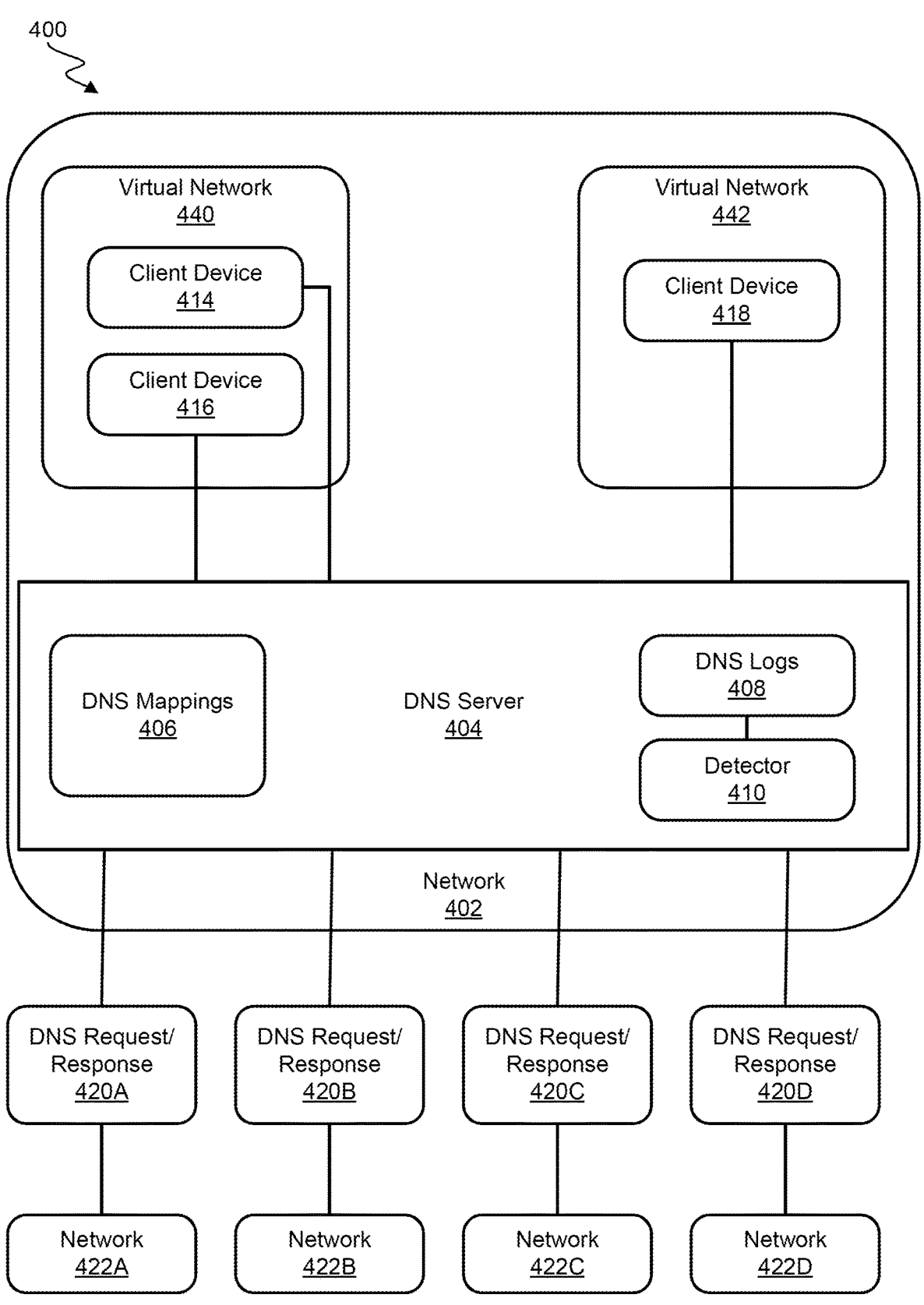

FIGS. 2, 3, and 4 show system diagrams illustrating example computer systems for detecting information exfiltration and/or infiltration in DNS communications. As shown in FIG. 2, a computer system 200 includes two DNS servers 204 and 224 that are each configured with detectors 210 and 230, respectively, for synchronous or asynchronous analysis, and/or are in communication with detectors 212 and 232, respectively, that operate on DNS logs 228 for asynchronous analysis. DNS servers 204 and 224 may exist on same or different networks and send DNS requests and responses 220 between each other. As shown, DNS server 204 is on network 202 and handles DNS requests internal to the network 202 from client devices 214, 216, and 218. Similarly, DNS server 224 is internal to network 222 and handles DNS requests internal to the network 222 from client devices 234, 236, and 238. The DNS servers may use DNS mappings 206 and 226, respectively, to provide services to client devices internal to their respective networks 202 and 222, and the DNS requests and responses 220 may be used to supplement DNS mapping 206 and/or 226 with information provided from a peer DNS server 224 or 204. Detectors 210, 212, 230, and/or 232 may operate to detect information infiltration and/or exfiltration from networks 202 and/or 222, respectively.

As shown in FIG. 3, a computer system 300 includes a DNS server 304 that is configured with a detector 310 to detect client device(s) 314, 316, and/or 318, and/or external network(s) or host(s) 322A, 322B, 322C, and/or 322D that are involved in data exfiltration or infiltration. DNS requests and responses 320A, 320B, 320C, and/or 320D forwarded outside of network 302 may be initiated by client devices 314, 316, and/or 318, targeting hosts, devices, or subnets on networks 322A, 322B, 322C, and/or 322D, respectively. In this example, networks 322A, 322B, 322C, and/or 322D may not be equipped with their own detector but may be detected as a target for exfiltrated information or a source of infiltrated information. In the example, the DNS requests and responses 320A, 320B, 320C, and/or 320D may be forwarded by DNS server 304 from client device(s) 314, 316, and/or 318 if the requested mapping information is not present in DNS mappings 306. Information exfiltration and/or infiltration may be detected in the requests and responses 320A, 320B, 320C, and/or 320D based on how much average and total information is communicated in the requests and responses 320A, 320B, 320C, and/or 320D.

As shown in FIG. 4, a computer system 400 includes a DNS server 404 on network 402 for detecting data exfiltration or infiltration involving client devices 414, 416, and/or 418 on virtual networks 440 and/or 442. DNS server 404 receives requests from client devices 414, 416, and/or 418, if the requests cannot be satisfied with DNS mappings 406, passes DNS requests and/or responses 420A, 420B, 420C, and/or 420D to other DNS servers on networks 422A, 422B, 422C, and/or 422D. The DNS communications are captured in DNS logs 408 and analyzed by detector 410 to detect data infiltration or exfiltration. For example, the requests and/or responses 420A, 420B, 420C, and/or 420D are analyzed to determine whether a threshold average or total amount of information is leaving network 402 or virtual network 440 or 442, and/or whether a threshold average or total amount of information is being sent to network 422A, 422B, 422C, and/or 422D.

In various embodiments, information exfiltration or infiltration is measured based on an average, mean, median, or mode amount of information exfiltrated or infiltrated from a source or to a destination, and/or based on a total or aggregate amount of information exfiltrated or infiltrated from a source to a destination. Such information may be tracked over different periods of time, which may include separate windows of time (e.g., 2:00 to just before 3:00 and 3:00 to just before 4:00) or overlapping windows of time (e.g., 2:00 to 3:00, 2:30 to 3:30, and 3:00 to 4:00). A high average and low total may indicate a lot of information is being communicated in few messages in a quick or spiked information leak. A low average and high total may indicate that a lot of information is being communicated in many messages that are being assembled at a destination in a prolonged information leak. Based on individual thresholds for averages and totals, and/or a threshold based on a combination of averages and totals, the DNS server traffic may be flagged as exfiltrating or infiltrating too much information over a period of time. If the DNS server traffic is flagged as exfiltrating or infiltrating too much information, a notification may be sent to a DNS traffic administrator, and/or filters may be imposed on the DNS traffic to prevent or limit the information being exfiltrated or infiltrated by certain endpoints that were involved in the flagged DNS server traffic.

Information conveyed in a DNS communication may be determined based on a length of the content item communicated in the DNS communication (for example, after a public portion of the DNS communication has been removed) and a number of unique characters in the content item. In one example, the information is determined by computing a product of the length of the content item communicated in the DNS communication and the logarithm of the number of different characters of the content item in the DNS communication. For example, for a string s as a content item in a DNS communication, let U(s) represent the number of distinct characters in s and Information(s) be defined as log 2(U(s))×length(s). The information may then be aggregated over many content items in many DNS communications.

The aggregate amount of information entering or leaving a network, from particular sources or to particular destinations, may be determined in a variety of ways consistent with the techniques described herein. The aggregate amount of information may refer to a total amount of information, a mean, median, or mode amount of information, or any other deterministic accounting of information across multiple DNS communications in a group. Non-unique or duplicate DNS communications may be removed before determining the aggregate amount of information since duplicate DNS communications do not communicate new information. Unique DNS communications in a group may be aggregated together, for example, by summing or averaging the information conveyed in each of the unique items of the group. The average may be computed by summing information conveyed by the unique content items in a group, dividing the summed information by the number of unique content items in the group.

DNS communications may be grouped based on any characteristic, including a source of the DNS communication or a characteristic, network, virtual network, subnetwork, or owner of the source, and/or a destination of the DNS communication or a characteristic, network, virtual network, subnetwork, or owner of the destination. An aggregate amount of information communicated by DNS communications in the group may cause responsive action to be triggered. For example, the aggregate amount may exceed a threshold, in which case the detector triggers a notification or other responsive action.

In one embodiment, rather than trigger a responsive action when the aggregate amount exceeds a threshold, the detector may trigger a responsive action when a pattern of the aggregate amount matches a notification signature. Rather than being based on the content of the DNS communication, the notification signature may be based on patterns in terms of the aggregate amount of information communicated by DNS communications in a group over time. For example, if the amount of information spikes up 50% in one time window as compared to a previous time window, a notification may be triggered. As another example, if the amount of information trends up in three consecutive time windows, a notification may be triggered. These patterns may be combined with thresholds to define one or more conditions for triggering responsive action. For example, a spike in information communicated in the group may trigger a notification if the average amount of information communicated in the group exceeds a first threshold and/or if a total amount of information exceeds a second threshold. As another example, an amount of information trending up in three consecutive time windows may trigger a notification if the average amount of information communicated in the group exceeds a first threshold and/or if a total amount of information communicated in the group exceeds a second threshold.

DNS Query Entropy

In one embodiment, a computer system stores DNS query communications processed by a DNS server. Each of the DNS query communications is described by DNS query communication characteristic(s), which may be in the communication or stored as metadata for the communication, and a content item. The content item is a remaining portion of the DNS query communication after a public portion of the DNS query communication has been removed. The DNS query communications may be clustered based on the DNS query communication characteristic(s). For each cluster, an aggregate amount of information conveyed by unique content items in the cluster may be determined based on a length of the unique content item and a number of different characters in the unique content item. A detector on the computer system may then detect that a particular cluster, which may be defined by one or more values for the DNS query communication characteristic(s), has a particular aggregate amount of information that satisfies one or more conditions for responsive action, and, as a result, trigger the responsive action.

In one embodiment, the DNS query communications are grouped based on a public domain name suffix of a DNS communication target of the DNS query communications. The DNS requests may be parsed by the detector to separate public domain suffixes from content items of request or response text. The public domain suffixes may be used for grouping the DNS query communications, while a remainder of the DNS query communication may be used to determine how much content that is potentially not public is being communicated by the DNS query communication. Information may be aggregated for DNS query communications in the group, and the group of DNS queries matching a particular domain name suffix may trigger responsive action if information communicated by the group exceeds a threshold.

In another embodiment, the DNS query communications are grouped based on a virtual network identifier, subnet identifier, host identifier, tenant or owner identifiers, or other identifier associated with a DNS communication source of the DNS query communications. Information about the DNS communication source may be retrieved as metadata from a log about the DNS communication, whether such information was part of the DNS communication or populated based on the DNS communication and supplemental information. The log may be populated based on the endpoint from which the DNS communication was received, optionally supplemented by a mapping of virtual network identifiers, subnet identifiers, host identifiers, endpoint tenants or owners, or other information. The content that is potentially not public from the DNS query communications may be used to determine how much potentially new information is being communicated in the content. Information may be aggregated for DNS query communications in the group, and the group of DNS queries from a source identified by a particular virtual network identifier, subnet identifier, host identifier, tenant or owner identifiers, or other identifier may trigger responsive action if information communicated by the group exceeds a threshold.

In one embodiment, information entropy is estimated based on the number of unique characters in the query in combination with the length of the query. For example, for a string s, let $U(s)$ represent the number of distinct characters in s and Information(s) be defined as $\log 2(U(s)) \times \text{length}(s)$. In this information determination, a query which is twice as long has twice the information, and a query which has twice the number of unique characters has length (q) more bits of information. For example, a hexadecimal digit has 16 or 24 possibilities, which can be represented as $\log 2(16)=4$ bits of information. A string of length q hexadecimal digits has $q \cdot 4$ bits of information that can be conveyed. In a second example, if the number of character possibilities is 32 for a base-32 digit, or 25, instead of 16, then each character can be represented as $\log 2(32)=5$ bits of information. In this second example, a string of length q base-32 digits has $q \cdot 5$ bits of information instead that can be conveyed. The amount of information that can be conveyed by the string can be measured based on the number of unique characters known to be possible in the string and the length of the string.

In some examples, each character is counted as conveying a full range of information known to be available to the character regardless of an individual probability that the character occurs in the domain name portion under analysis. If information is instead determined based on individual character probabilities, the information conveyed by longer domain name portions may be deflated in comparison with the actual number of bits being communicated between two endpoints. This artificial deflation occurs based on a small sample size of character probabilities in a domain name portion when instead the domain name portion actually conveys a number of bits corresponding to the range of data that could have been sent in the domain name portion. In another embodiment, the individual probability that each character occurs and the length of the domain name portion are both taken into account when determining information to dampen the impact of redundant characters while still counting longer domain name portions as conveying more information.

Information may be measured in any manner using the length of content that is potentially not public, such as content in a domain name prefix after a publicly available suffix and optionally delimiters (".") are removed, and an amount of variation within the domain name portion (e.g., how many unique characters are known or suspected to be used in the domain name portion). In one embodiment, if a common character format, such as hexadecimal, Unicode, Punycode, or ASCII text, occurs but for a small subset of characters available to the format, the domain name may be assumed to convey information at a rate consistent with the full set of characters of the common character format. For example, if all hexadecimal characters but "e" occur, the domain name prefix may be determined to convey hexadecimal information with an amount of information based on a length of the domain name prefix and a number of bits conveyed by each character of hexadecimal information, 4. In this example, the detector is inferring that hexadecimal information is being conveyed based on partial evidence that the hexadecimal character spectrum has been covered.

For an example query eefa014dc7686d0fa412c95-be598b36e6d.xyzzy.com, the query may be split into a prefix of eefa014dc7686d0fa412c95be598b36e6d and a suffix of xyzzy.com. The content portions may be evaluated as public or non-public as of the time of DNS communication, even if the content of the DNS communication is being evaluated asynchronously later. In one embodiment, this split is done using the Public Suffix List, available at publicsuffix.org, to identify a public portion of the query that may be excluded from the information determination. In another embodiment, the split is done using another suffix list that is determined based on mappings previously (e.g., previously to a time of the DNS communication) received from a variety of DNS servers. In this embodiment, the mappings, portions of mappings, or suffixes common to or previously known by multiple DNS servers may be considered "public" and excluded from the information determination. If the mappings had been previously distributed, there would not likely be secret information contained in the mappings.

The public suffix may identify the DNS server which ultimately receives the query, and the prefix separates out the part of the query which could carry new information to that DNS server. As the suffix is the server's own public name, the suffix is excluded from the information calculation.

For each time window of a set of time windows, the detector may determine, for each distinct DNS server S identified by suffix (q) as above, Q(S)=set of queries from all sources towards DNS server S, and P(S)=set of distinct prefixes {prefix (q) for all q in Q(s)}. Total Information(S)= sum information (p) for all p in P(S). Distinct prefixes(S)= length (P(S)). Average Information(S)=Total Information (S)/Distinct Prefixes(S). Entropy(s)=Average Information (S). Triggers may be set up based on total or average information for any grouping of DNS communications in the time window or between time windows.

The detector uses the set of distinct queries to each DNS server because non-distinct queries might not be transported all of the way to the target DNS server. Once a mapping has been retrieved for the query, the mapping may be re-used for any duplicates of the query. Resolving DNS queries may involve caching mappings at multiple intermediate points for efficiency, and a duplicate query may be answered from such a cache of at least one intermediate DNS server. A duplicate query, in theory, also does not contain any additional information beyond the duplicate's twin.

DNS data may be monitored over an extended period (e.g., 1, 2, 3, or 4 weeks), and the overall time window may be divided into smaller time slices or windows (e.g., 1, 2, 6, 12, or 24 hours). For all observed DNS domains in each time-slice, the Total Information and Average Information is calculated. Thresholds may be set for Total Information and Average Information (e.g., Average Information=100, 350, or 500 and Total Information=10,000, 30,000, or 100,000). The DNS query monitor may select the domains which exceed either of these thresholds in any time slice and alert for those domains the Total Information and/or Average Information over the time slice and/or the whole window. This alert gives a general picture of the possible exfiltration (or command-and-control) traffic over the whole time window. Other monitoring and logging systems may also be used to analyze sources of the traffic and analyze the queries themselves, for example, to incorporate blacklists of bad actors and blacklists of communication signatures that also trigger flagging or filtering communications.

The detector may whitelist certain domains as "innocent" abusers of DNS agents. For example, anti-malware software from mcaffee.com encodes "fingerprints" of suspected malware as the prefix part of DNS queries to their domain. If mcaffee.com is a trusted domain for exporting malware definition information, based on a known purpose of the McAfee tool and mcaffee.com site, then mcafee.com may be treated as a trusted or innocent domain and be whitelisted. The number of innocent domains receiving high Total Information traffic or high Average Information traffic is limited, and the innocent abusers can be whitelisted (e.g. dozens or a few hundred domains, depending on the use case) to prevent analysis of known use cases of exfiltrating information using DNS queries.

In another embodiment, pairs of sources and targets may be whitelisted together, where certain sources are known to query or respond to certain targets for known use cases. In this embodiment, sources or targets are not whitelisted individually but only if they are used in combination with each other.

In one embodiment, a whitelisted source may still send a DNS query to a non-whitelisted destination, and the non-whitelisted destination may be detected as a target for high information exfiltration, regardless of whether the information came from a whitelisted source or not. The target for high information exfiltration may be marked with an indicator of possible compromise, which may trigger a notification or other corrective action.

In another embodiment, rather than estimating the information going to one particular DNS domain, the DNS query monitor estimates the information emerging from one particular VCN (virtual network). In this embodiment, even if exfiltration traffic was spread very thinly across many domains under the control of an attacker, the alert may be triggered when the Total Information or Average Information from a VCN exceeded appropriate thresholds. Analyzing per-VCN information exfiltration allows detection of a compromised network or host when other networks or hosts are not similarly compromised, even if the compromised network or host is sending information to a variety of destinations that have not been sent enough information individually to be detected as compromised destinations.

In one embodiment, the DNS log includes an identifier of the virtual network from which a request was received. In another embodiment, the DNS log includes a source identifier of an IP address from which a request was received. Source identifiers may be grouped and analyzed by virtual network or subnet and analyzed to detect high traffic and/or high information exfiltrating virtual networks or subnets. Similarly, groups of virtual networks or subnets may be whitelisted or blacklisted.

In another example, source identifiers may be grouped by owner or tenant, such that individual owners or tenants may be detected as exfiltrating high information, and may be analyzed and flagged separately. The multiple tenants or owners may use the same DNS server, and the DNS server may receive owner identifier information, which may be an IP address mapped to the owner, as part of the DNS request. Accordingly, the logs generated for different owners or tenants may be analyzed separately or together based on the centralized use of the DNS server. The different tenants and owners may also be whitelisted or blacklisted, depending in whether the tenants and owners are detected as improperly exfiltrating or infiltrating information to a multi-tenant system.

In a particular example, the detector analyzes queries based on a virtual network of a source of the queries. If a query eefa014dc7686d0fa412c95be598b36e6d.xyzzy.com was sent by a VCN with identifier id-12345, the input may include a prefix of eefa014dc7686d0fa412c95be598b36e6d, a suffix of xyzzy.com, and a VCN of id-12345. Rather than determining the Average Information and Total Information specific to the suffix, the Average Information and Total Information are determined for distinct queries from the VCN, which may be sent from different IP addresses and/or to different destinations. In this example, the suffixes are ignored in this determination even though the queries are potentially to many different destination domains. This allows the DNS Query Monitor to detect exfiltration attacks that use many (e.g. dozens or hundreds) of domains to exfiltrate some data to each one over time.

In another embodiment, rather than grouping queries by VCN, the queries may be grouped by host or a set of hosts, by a subnet or set of subnets, by owner, based on some other characteristic that defines a source regardless of the destination, based on some characteristic that defines a destination regardless of the source, by a pairing of source and destination, and/or by a query type (e.g. A, AAAA, TXT, MX, etc).

DNS Response Entropy

In one embodiment, a computer system stores DNS response communications processed by a DNS server. Each of the DNS response communications is described by DNS response communication characteristic(s), which may be in the communication or stored as metadata for the communication, and a content item. The content item is a remaining portion of the DNS response communication after a public portion of the DNS response communication has been removed. The DNS response communications may be clustered based on the DNS response communication characteristic(s). For each cluster, an aggregate amount of information conveyed by unique content items in the cluster may be determined based on a length of the unique content item and a number of different characters in the unique content item. A detector on the computer system may then detect that a particular cluster, which may be defined by one or more values for the DNS response communication characteristic(s), has a particular aggregate amount of information that satisfies one or more conditions for responsive action, and, as a result, trigger the responsive action.

In one embodiment, the DNS response communications are grouped based on identifiers associated with a DNS communication source of the DNS response communications. Information about the DNS communication source, destination, or another shared characteristic may be retrieved as metadata from a log about the DNS communication, whether such information was part of the DNS communication or populated based on the DNS communication and supplemental information. The log may be populated based on the endpoint from which the DNS communication was received, optionally supplemented by a mapping of virtual network identifiers, subnet identifiers, host identifiers, endpoint tenants or owners, or other information. For example, the DNS communications may be grouped based on a virtual network identifier of a DNS communication source or target, and/or a public domain suffix of the DNS response source or target. The content that is potentially not public from the DNS response communications may be used to determine how much new information is potentially being communicated. Information may be aggregated for DNS response communications in the group, and the group of DNS responses from a source, to a destination, or having another shared characteristic may trigger responsive action if information communicated by the group exceeds a threshold.

In another embodiment, the detector collects distinct responses to queries sent to a domain rather than distinct prefixes of queries sent to the domain. Then, Total Information and/or Average Information may be determined for the responses on a per-domain basis. This metric may indicate which DNS server appears to be sending the most information, summed over all recipients. A domain which appears to be sending a lot of information may be using DNS responses as a covert-channel to infiltrate data to some waiting malware, even if none of the destinations are receiving enough information individually to trigger a warning notification.

In another embodiment, the detector collects distinct responses to queries from a VCN rather than distinct prefixes of queries sent by the VCN, and the Total Information and/or Average Information may be determined for those responses. This metric may indicate which VCNs appear to be receiving the most information, summed over all DNS servers. A VCN which appears to be receiving a lot of information may be using DNS responses as a covert channel to infiltrate data to waiting malware.

In another embodiment, rather than grouping responses by VCN, the responses may be grouped by host or a set of hosts, by a subnet or set of subnets, by owner, based on some other characteristic that defines a source regardless of the destination, based on some characteristic that defines a destination regardless of the source, by a pairing of source and destination, and/or by a response type (e.g. A, AAAA, TXT, MX, etc).

Correcting Infiltration and Exfiltration

The detector may track aggregate information metrics for many potentially overlapping groups of DNS communications, grouped based on any available characteristic. An aggregate amount of information communicated by DNS communications in the group may cause responsive action to be triggered. For example, a responsive action may be triggered when the aggregate amount may exceed a threshold and/or when a pattern of the aggregate amount over time matches a notification signature. These patterns may be combined with thresholds to define one or more conditions for triggering responsive action, for example, based on a spike, trend, average information, total information, rolling average information, median information, or mode information, over one or more windows or consecutive windows.

The responsive action may include a notification being sent to an administrator of DNS communications or other user who has registered a concern for DNS communication security. The responsive action may include an addition of endpoints involved in the excess information communicated to be blacklisted, whitelisted, or flagged for review. The information communicated and metrics causing the triggered responsive action may be displayed to a user on a user interface for review, and to prompt additional corrective action if needed.

In various embodiments, a notification may be sent indicating a total information has exceeded a boundary. The notification may appear in an email message, text message, pop-up notification, application notification, or any other notification that becomes visible to the user for further analysis. The notification may include a graph showing the information communicated from a particular source or to a particular destination over time. The notification may be based on the total information and/or average information, and/or a combination of total and average information over a period of time. If provided in the notification, graphs may include good examples to show information from a source or to a destination that is known to be within limits, and a warning example to show information from a source or to a destination that exceeded limits. In another example, graphs may show and label phase changes where communications from a particular source or to a particular destination changed in exceeding limits or staying within limits, and/or otherwise changed in how much information was being communicated between endpoints over time, with communications in the same phase showing a same pattern and communications in other phases showing a different pattern. The graphs may also mark changes in trends, such as trends of increasing information between windows to trends of steady or decreasing information between windows. The graphs may also mark signatures detected, such as spikes, dips, or multi-window patterns.

The notification or other responsive action may reveal the aggregate information that lead to the responsive action as well as the characteristic(s) that define the group of excessive communications for which the responsive action was triggered. For example, the notification may identify the virtual network identifier of a virtual network that was detected to be exfiltrating too much information over a window of time, as well as an aggregate amount of information exfiltrated from the virtual network. As another example, the notification may identify a domain to which too much information was exfiltrated over a window of time, as well as an aggregate amount of information exfiltrated to the domain.

Figure 5:
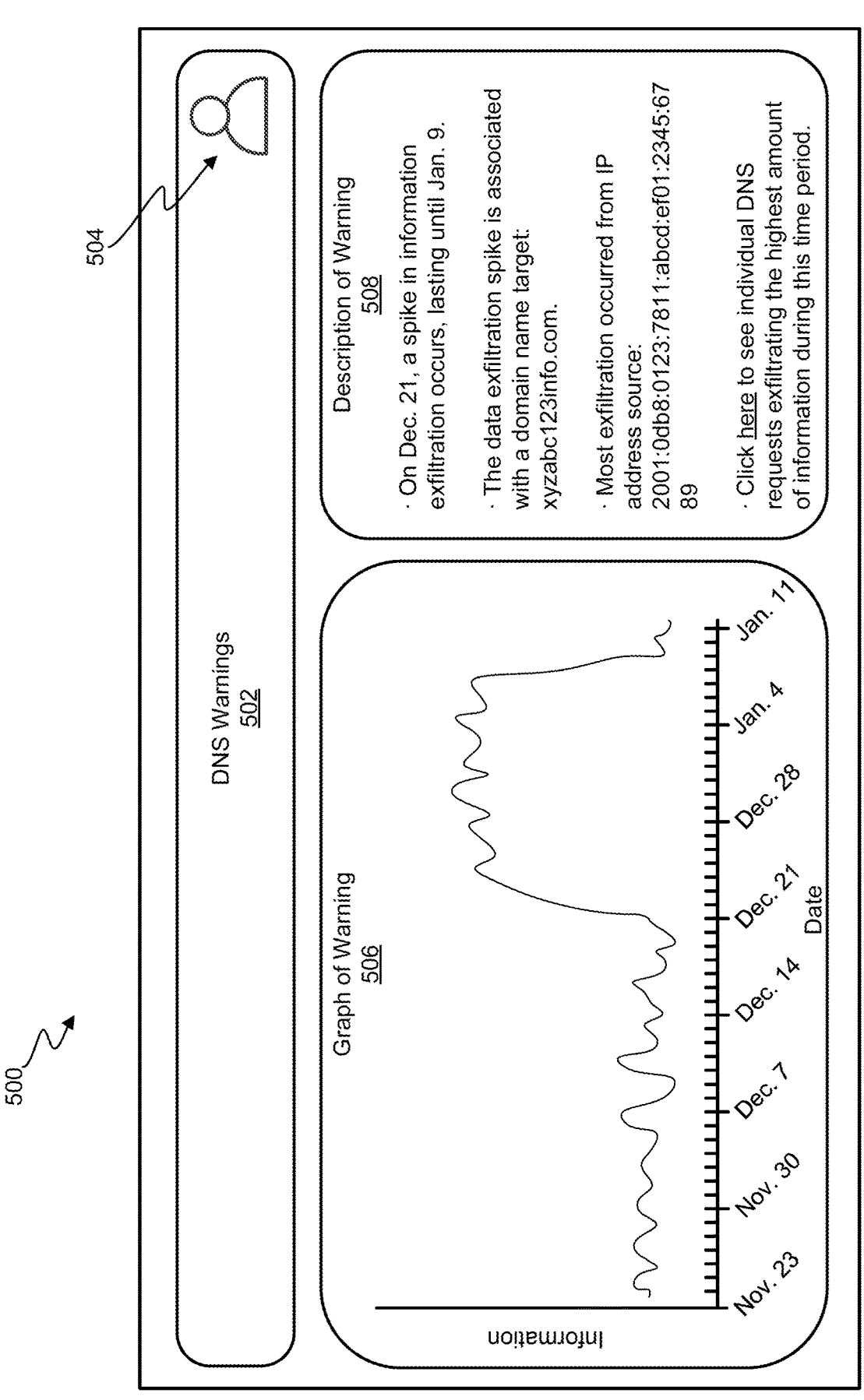
FIG. 5 shows an example user interface for displaying a warning about information exfiltration and/or infiltration in DNS communications.

FIG. 5 shows an example user interface 500 for displaying a warning about information exfiltration and/or infiltration in DNS communications. As shown, a title bar 502 heads a page about DNS warnings for a user, who is logged in as user 504. User 504 may have custom profiles and notifications stored and tailored for the user to highlight DNS traffic of concern as determined by the user. The graph of warning 506 includes a graph of information communicated by a group of DNS communications over time, showing a spike in information exfiltration that occurs between December 21 and January 9. A description of the warning 508 is provided to describe the warning in more detail. The description 508 also includes an option to drill down into individual DNS requests to see the data that was exfiltrated so the analyzing user can determine if any additional observations can be made. User interface 500 may also include an option to add the group of DNS communications to a whitelist or blacklist, or to share the notification or graph with other users for further analysis and corrective action.

In various embodiments, the aggregate information communicated by a group of DNS communications may be added as an indicator or metric of concern to a detector that accounts for other patterns in network communications, DNS or otherwise, and looks for signatures known to be associated with compromised activity and/or endpoints known to be involved in compromised activity. These metrics of concern may be used by a firewall to determine which communications to allow and which communications to block at a network boundary, and/or by an analyst to determine which endpoints to blacklist, which signatures to register, and what corrective actions to take.

In one example, the detector itself or an analyst may trigger a diagnostic operation on a device involved in the excessive communications to eliminate malware on the device. The diagnostic operation may involve a resetting of certain virtual resources, such as a browser or virtual network device, and/or a resetting of the system as a whole, virtual or otherwise, which may involve a factory reset and a reconfiguration of the system. The diagnostic operation may also involve installing, updating, or running antivirus software on the machine to fix a component responsible for the excessive communications.

In one embodiment, even without an alert being triggered, an analyst may use the user interface to analyze, on a periodic basis, traffic that has communicated high information but which may or may not have yet triggered an alert. The analyst may adjust thresholds and conditions for the notifications to ensure that suspicious traffic is detected and non-suspicious traffic is whitelisted or otherwise does not satisfy the conditions.

Computer System Architecture

Figure 6:
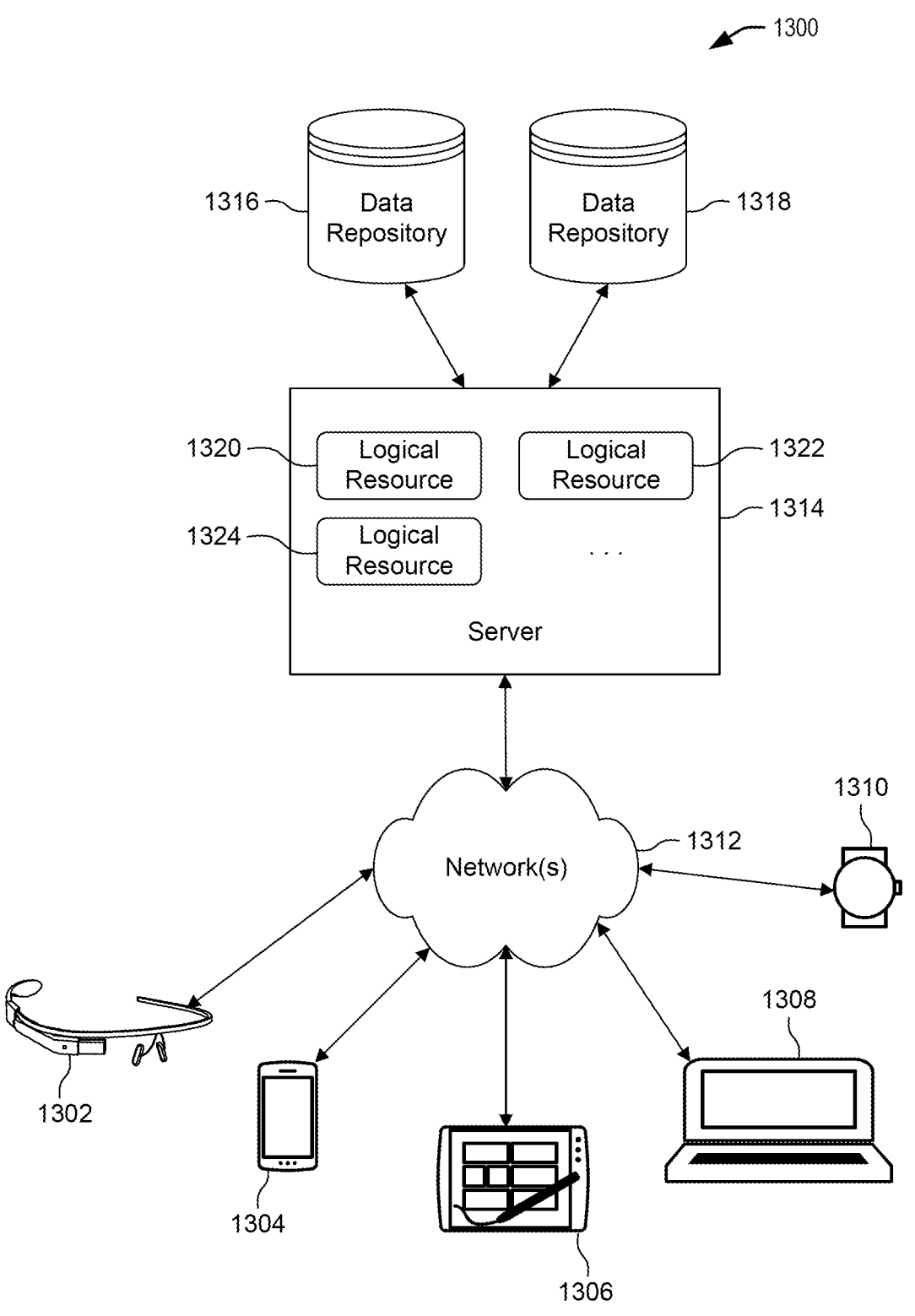
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, 608, and/or 610 coupled to a server 614 via one or more communication networks 612. Clients computing devices 602, 604, 606, 608, and/or 610 may be configured to execute one or more applications.

In various aspects, server 614 may be adapted to run one or more services or software applications that enable techniques for detecting data exfiltration or infiltration over DNS communications.

In certain aspects, server 614 may also provide other services or software applications that can include non-virtual and virtual environments. In some aspects, these services may be offered as web-based or cloud services, such as under a Software as a Service (SaaS) model to the users of client computing devices 602, 604, 606, 608, and/or 610. Users operating client computing devices 602, 604, 606, 608, and/or 610 may in turn utilize one or more client applications to interact with server 614 to utilize the services provided by these components.

In the configuration depicted in FIG. 6, server 614 may include one or more components 620, 622 and 624 that implement the functions performed by server 614. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, 608, and/or 610 for techniques for detecting data exfiltration or infiltration over DNS communications in accordance with the teachings of this disclosure. A client device may provide an interface that enables a user of the client device to interact with the client device. The client device may also output information to the user via this interface. Although FIG. 6 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 612 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 612 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 614 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 614 can include one or more virtual machines running virtual operating systems, or other computing architectures involving virtualization such as one or more flexible pools of logical storage devices that can be virtualized to maintain virtual storage devices for the server. In various aspects, server 614 may be adapted to run one or more services or software applications that provide the functionality described in the foregoing disclosure.

The computing systems in server 614 may run one or more operating systems including any of those discussed above, as well as any commercially available server operating system. Server 614 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 614 may include one or more applications to analyze and consolidate data feeds and/or event updates received from users of client computing devices 602, 604, 606, 608, and/or 610. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 614 may also include one or more applications to display the data feeds and/or real-time events via one or more display devices of client computing devices 602, 604, 606, 608, and/or 610.

Distributed system 600 may also include one or more data repositories 616, 618. These data repositories may be used to store data and other information in certain aspects. For example, one or more of the data repositories 616, 618 may be used to store information for techniques for detecting data exfiltration or infiltration over DNS communications. Data repositories 616, 618 may reside in a variety of locations. For example, a data repository used by server 614 may be local to server 614 or may be remote from server 614 and in communication with server 614 via a network-based or dedicated connection. Data repositories 616, 618 may be of different types. In certain aspects, a data repository used by server 614 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 616, 618 may also be used by applications to store application data. The data repositories used by applications may be of different types such as, for example, a key-value store repository, an object store repository, or a general storage repository supported by a file system.

In one embodiment, server 614 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 7:
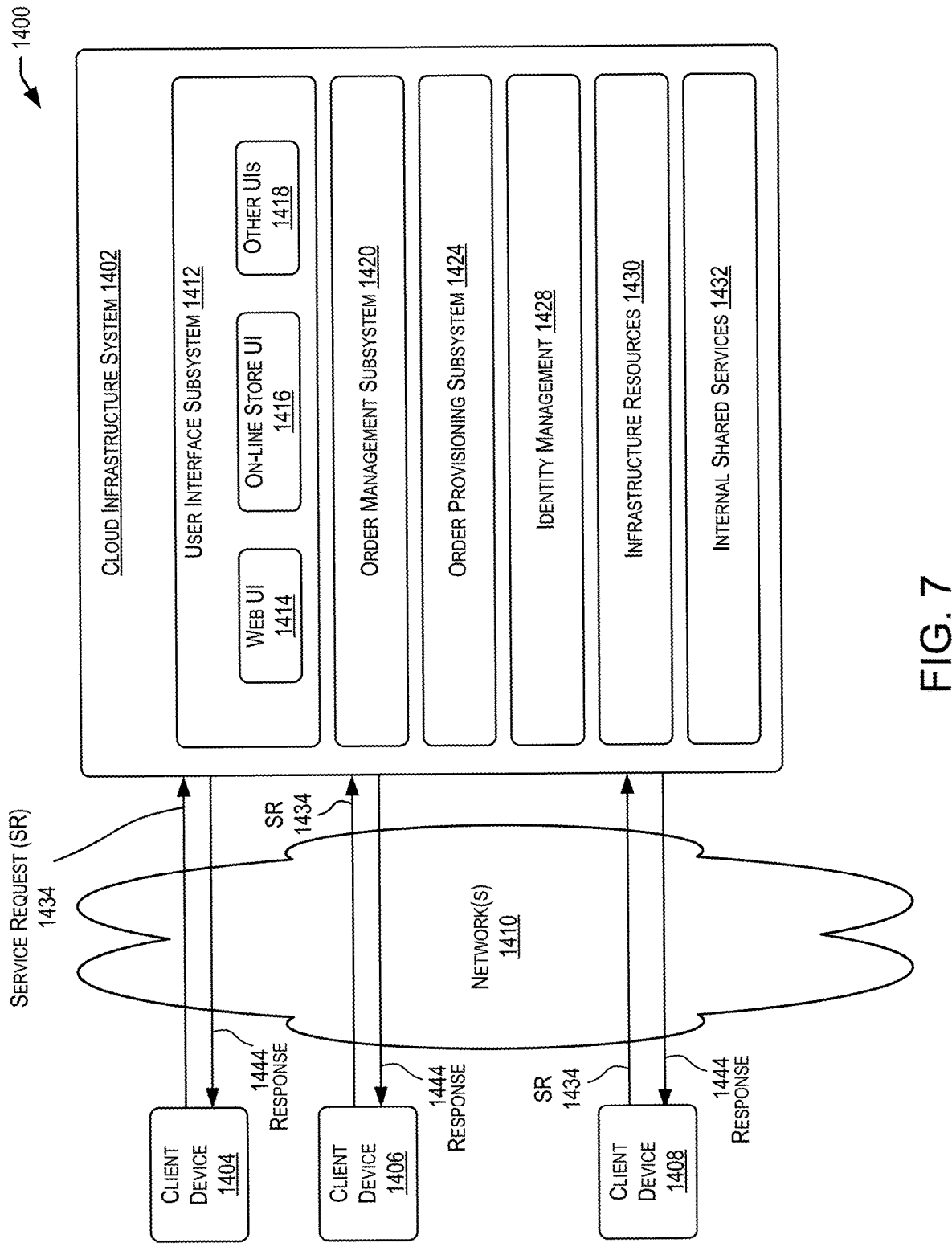
FIG. 7 is a simplified block diagram of one or more components of a system environment by which services provided by one or more components of an embodiment system may be offered as cloud services, in accordance with certain aspects.

FIG. 7 is a simplified block diagram of a cloud-based system environment in which a detector may detect data exfiltration or infiltration over DNS communications, in accordance with certain aspects. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG.

7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 702 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 702. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 702. Cloud infrastructure system 702 then performs processing to provide the services requested in the tenant's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public tenant, where the tenant can be an individual or an enterprise. In certain other aspects, under a private cloud model, cloud infrastructure system 702 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702.

In some aspects, the processing performed by cloud infrastructure system 702 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a tenant may, using a client device, request (service request 734) one or more services provided by cloud infrastructure system 702 using one or more of interfaces 714, 716, and 718. For example, a tenant may access the online store, browse cloud services offered by cloud infrastructure system 702, and place a subscription order for one or more services offered by cloud infrastructure system 702 that the tenant wishes to subscribe to. The service request may include information identifying the tenant and one or more services that the tenant desires to subscribe to.

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 702 may send a response or notification 744 to the requesting tenant to indicate when the requested service is now ready for use. In some instances, information (e.g., a link) may be sent to the tenant that enables the tenant to start using and availing the benefits of the requested services.

Cloud infrastructure system 702 may provide services to multiple tenants. For each tenant, cloud infrastructure system 702 is responsible for managing information related to one or more subscription orders received from the tenant, maintaining tenant data related to the orders, and providing the requested services to the tenant or clients of the tenant. Cloud infrastructure system 702 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 702 may provide services to multiple tenants in parallel. Cloud infrastructure system 702 may store information for these tenants, including possibly proprietary information. In certain aspects, cloud infrastructure system 702 comprises an identity management subsystem (IMS) 728 that is configured to manage tenant's information and provide the separation of the managed information such that information related to one tenant is not accessible by another tenant. IMS 728 may be configured to provide various security-related services such as identity services, such as information access management, authentication and authorization services, services for managing tenant identities and roles and related capabilities, and the like.

Figure 8:
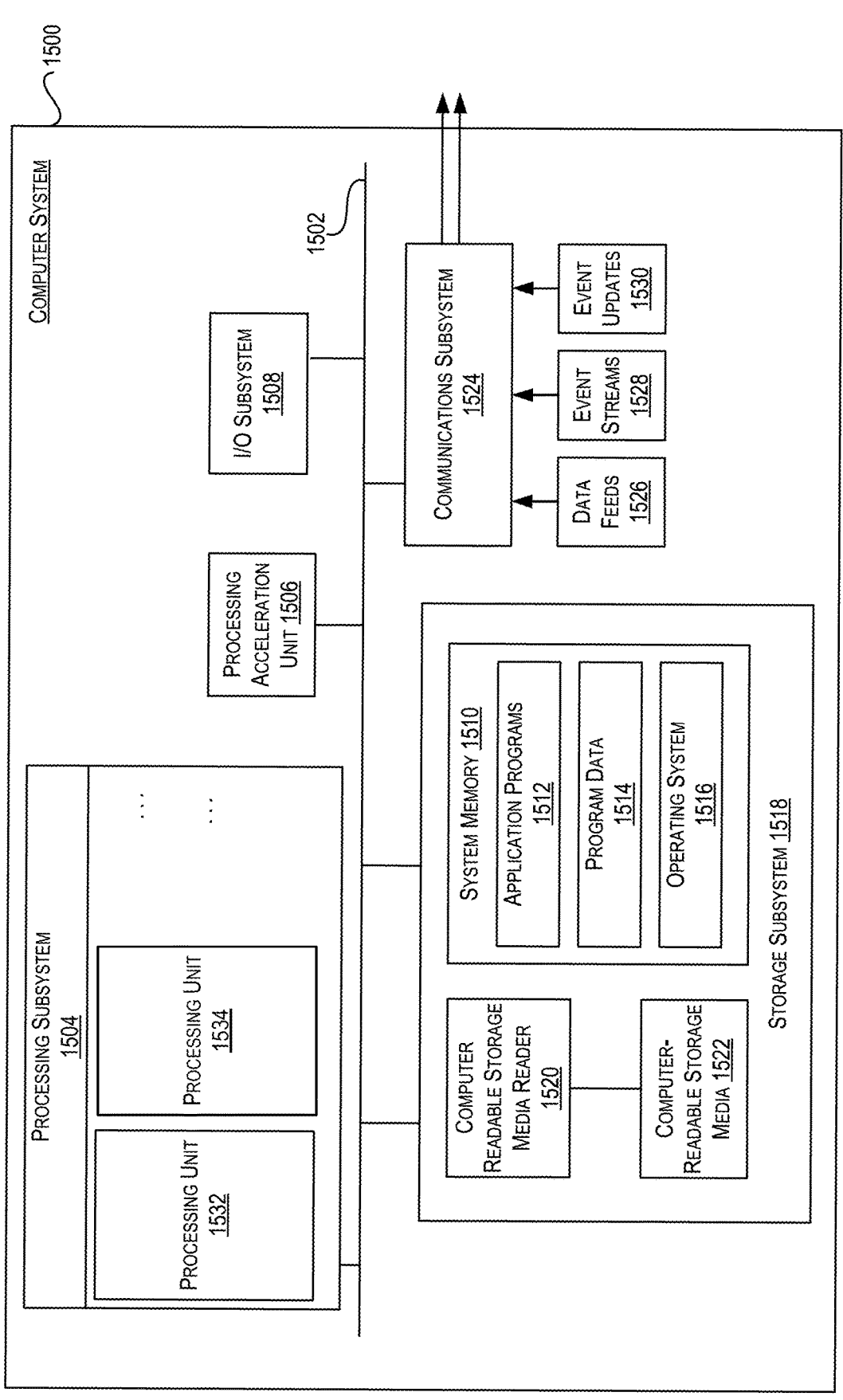
FIG. 8 illustrates an example computer system that may be used to implement certain aspects.

FIG. 8 illustrates an exemplary computer system 800 that may be used to implement certain aspects. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 822 may store programming and data constructs that provide the functionality of some aspects. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
storing a plurality of Domain Name Service (DNS) communications for a DNS server, wherein each DNS communication of the plurality of DNS communications comprises one or more DNS communication characteristics and a content item;
generating a plurality of clusters of content items from the plurality of DNS communications based at least in part on at least one DNS communication characteristic of the one or more DNS communication characteristics;
for each cluster of particular content items of the plurality of clusters of content items from the plurality of DNS communications, determining an aggregate amount of information conveyed by the particular content items in the cluster based at least in part on:
determining, for each unique content item among the particular content items, an individual amount of information based on a number of character possibilities of the unique content item such that the number of character possibilities is determined from:

a length of the unique content item, and
a format including a number of different characters used at least once in the unique content item, wherein the unique content item uses only a subset of available characters; and
aggregating the individual amount of information for the particular content items;
detecting that a particular cluster having a particular one or more values for the at least one DNS communication characteristic has a particular aggregate amount of information that satisfies one or more notification conditions;
based at least in part on detecting that the particular cluster has the particular aggregate amount of information that satisfies the one or more notification conditions, triggering a notification reporting the particular aggregate amount of information and the particular one or more values for the at least one DNS communication characteristic.

2. The computer-implemented method of claim 1, wherein the plurality of DNS communications comprise DNS requests, and wherein the at least one DNS communication characteristic comprises a public domain name suffix of a DNS communication target, the computer-implemented method further comprising parsing the DNS requests to separate public domain suffixes from content items of request text.

3. The computer-implemented method of claim 1, wherein the plurality of DNS communications comprise DNS requests, and wherein the at least one DNS communication characteristic comprises a virtual network identifier of a DNS communication source, the computer-implemented method further comprising accessing metadata associated with the DNS requests to identify virtual network identifiers of sources of the DNS requests.

4. The computer-implemented method of claim 1, wherein the plurality of DNS communications comprise DNS requests, and wherein the at least one DNS communication characteristic comprises a subnet identifier of a DNS communication source, the computer-implemented method further comprising accessing metadata associated with the DNS requests to identify subnet identifiers of sources of the DNS requests.

5. The computer-implemented method of claim 1, wherein the plurality of DNS communications comprise DNS requests, and wherein the at least one DNS communication characteristic comprises a host comprising a DNS communication source, the computer-implemented method further comprising accessing metadata associated with the DNS requests to identify hosts that originated the DNS requests.

6. The computer-implemented method of claim 1, wherein the plurality of DNS communications comprise DNS requests, and wherein the at least one DNS communication characteristic comprises a tenant source of a DNS communication, the computer-implemented method further comprising accessing metadata associated with the DNS requests to identify tenant sources of the DNS requests.

7. The computer-implemented method of claim 1, wherein the plurality of DNS communications comprise DNS responses, and wherein the at least one DNS communication characteristic comprises a virtual network identifier of a DNS communication source, the computer-implemented method further comprising accessing metadata associated with the DNS responses to identify virtual network identifiers of sources of the DNS responses.

8. The computer-implemented method of claim 1, wherein the plurality of DNS communications comprise DNS responses, and wherein the at least one DNS communication characteristic comprises a public domain suffix of a DNS communication target, the computer-implemented method further comprising parsing the DNS responses to separate public domain suffixes from content items of response text.

9. The computer-implemented method of claim 1, wherein determining the individual amount of information based on the number of character possibilities of the unique content item further comprises: computing a product of the length of the unique content item from unique content items among the particular content items and a logarithm of the number of different characters in the format of the unique content item from the unique content items, and wherein the aggregating the individual amount of information for the particular content items comprises summing information conveyed by the unique content items.

10. The computer-implemented method of claim 1, the computer-implemented method further comprising:

determining the number of unique content items among the particular content items;

computing a sum of information conveyed by the unique content items; and dividing the summed information by the number of the unique content items;

wherein the aggregate amount of information is an average amount of information conveyed by the unique content items.

11. A computer-program product comprising one or more non-transitory machine-readable storage media, including stored instructions configured to cause a computing system to perform a set of actions including:

storing a plurality of Domain Name Service (DNS) communications for a DNS server, wherein each DNS communication of the plurality of DNS communications comprises one or more DNS communication characteristics and a content item;

generating a plurality of clusters of content items from the plurality of DNS communications based at least in part on at least one DNS communication characteristic of the one or more DNS communication characteristics;

for each cluster of particular content items of the plurality of clusters of content items from the plurality of DNS communications, determining an aggregate amount of information conveyed by the particular content items in the cluster based at least in part on:

determining, for each unique content item among the particular content items, an individual amount of information based on a number of character possibilities of the unique content item such that the number of character possibilities is determined from: a length of the unique content item, and a format including a number of different characters used at least once in the unique content item, wherein the unique content item uses only a subset of available characters; and aggregating the individual amount of information for the particular content items;

detecting that a particular cluster having a particular one or more values for the at least one DNS communication characteristic has a particular aggregate amount of information that satisfies one or more notification conditions;

based at least in part on detecting that the particular cluster has the particular aggregate amount of information that satisfies the one or more notification conditions, triggering a notification reporting the particular aggregate amount of information and the particular one or more values for the at least one DNS communication characteristic.

12. The computer-program product of claim 11, wherein the plurality of DNS communications comprise DNS requests, and wherein the at least one DNS communication characteristic comprises a public domain name suffix of a DNS communication target, the set of actions further including parsing the DNS requests to separate public domain suffixes from content items of request text.

13. The computer-program product of claim 11, wherein the plurality of DNS communications comprise DNS requests, and wherein the at least one DNS communication characteristic comprises a virtual network identifier of a DNS communication source, the set of actions further including accessing metadata associated with the DNS requests to identify virtual network identifiers of sources of the DNS requests.

14. The computer-program product of claim 11, wherein the plurality of DNS communications comprise DNS responses, and wherein the at least one DNS communication characteristic comprises a public domain suffix of a DNS communication target, the set of actions further including parsing the DNS responses to separate public domain suffixes from content items of response text.

15. The computer-program product of claim 11, wherein the plurality of DNS communications comprise DNS responses, and wherein the at least one DNS communication characteristic comprises a virtual network identifier of a DNS communication source, the set of actions further including accessing metadata associated with the DNS responses to identify virtual network identifiers of sources of the DNS responses.

16. The computer-program product of claim 11, wherein the plurality of DNS communications comprise DNS responses, and wherein the at least one DNS communication characteristic comprises a public domain suffix of a DNS communication target, the computer-implemented method further comprising parsing the DNS responses to separate public domain suffixes from content items of response text.

17. The computer-program product of claim 11, wherein determining the individual amount of information based on the number of character possibilities of the unique content item further comprises: computing a product of the length of the unique content item from unique content items among the particular content items and a logarithm of the number of different characters in the format of the unique content item from the unique content items, and wherein the aggregating the individual amount of information for the particular content items comprises summing information conveyed by the unique content items.

18. A system comprising:

one or more processors;

one or more non-transitory computer-readable media storing instructions, which, when executed by the system, cause the system to perform a set of actions including:

storing a plurality of Domain Name Service (DNS) communications for a DNS server, wherein each DNS communication of the plurality of DNS communications comprises one or more DNS communication characteristics and a content item;

generating a plurality of clusters of content items from the plurality of DNS communications based at least in part on at least one DNS communication characteristic of the one or more DNS communication characteristics;

for each cluster of particular content items of the plurality of clusters of content items from the plurality of DNS communications, determining an aggregate amount of information conveyed by the particular content items in the cluster based at least in part on:

determining, for each unique content item among the particular content items, an individual amount of information based on a number of character possibilities of the unique content item such that the number of character possibilities is determined from:
a length of the unique content item, and
a format including a number of different characters used at least once in the unique content item, wherein the unique content item uses only a subset of available characters; and
aggregating the individual amount of information for the particular content items;

detecting that a particular cluster having a particular one or more values for the at least one DNS communication characteristic has a particular aggregate amount of information that satisfies one or more notification conditions;

based at least in part on detecting that the particular cluster has the particular aggregate amount of information that satisfies the one or more notification conditions, triggering a notification reporting the particular aggregate amount of information and the particular one or more values for the at least one DNS communication characteristic.

19. The system of claim 18, wherein the plurality of DNS communications comprise DNS requests, and wherein the at least one DNS communication characteristic comprises a public domain name suffix of a DNS communication target, the set of actions further including parsing the DNS requests to separate public domain suffixes from content items of request text.

20. The system of claim 18, wherein the plurality of DNS communications comprise DNS requests, and wherein the at least one DNS communication characteristic comprises a virtual network identifier of a DNS communication source, the set of actions further including accessing metadata associated with the DNS requests to identify virtual network identifiers of sources of the DNS requests.

21. The system of claim 18, wherein the plurality of DNS communications comprise DNS responses, and wherein the at least one DNS communication characteristic comprises a public domain suffix of a DNS communication target, the set of actions further including parsing the DNS responses to separate public domain suffixes from content items of response text.

22. The system of claim 18, wherein the plurality of DNS communications comprise DNS responses, and wherein the at least one DNS communication characteristic comprises a virtual network identifier of a DNS communication source, the set of actions further including accessing metadata associated with the DNS responses to identify virtual network identifiers of sources of the DNS responses.

23. The system of claim 18, wherein the plurality of DNS communications comprise DNS responses, and wherein the at least one DNS communication characteristic comprises a public domain suffix of a DNS communication target, the computer-implemented method further comprising parsing the DNS responses to separate public domain suffixes from content items of response text.

24. The system of claim 18, wherein determining the individual amount of information based on the number of character possibilities of the unique content item further comprises: computing a product of the length of the unique content item from unique content items among the particular content items and a logarithm of the number of different characters in the format of the unique content item from the unique content items, and wherein the aggregating the individual amount of information for the particular content items comprises summing information conveyed by the unique content items.

* * * * *